(No Model.)
D. B. SCHAEFFER.
SWATHING ATTACHMENT FOR HARVESTERS.
No. 418,141. Patented Dec. 24, 1889.
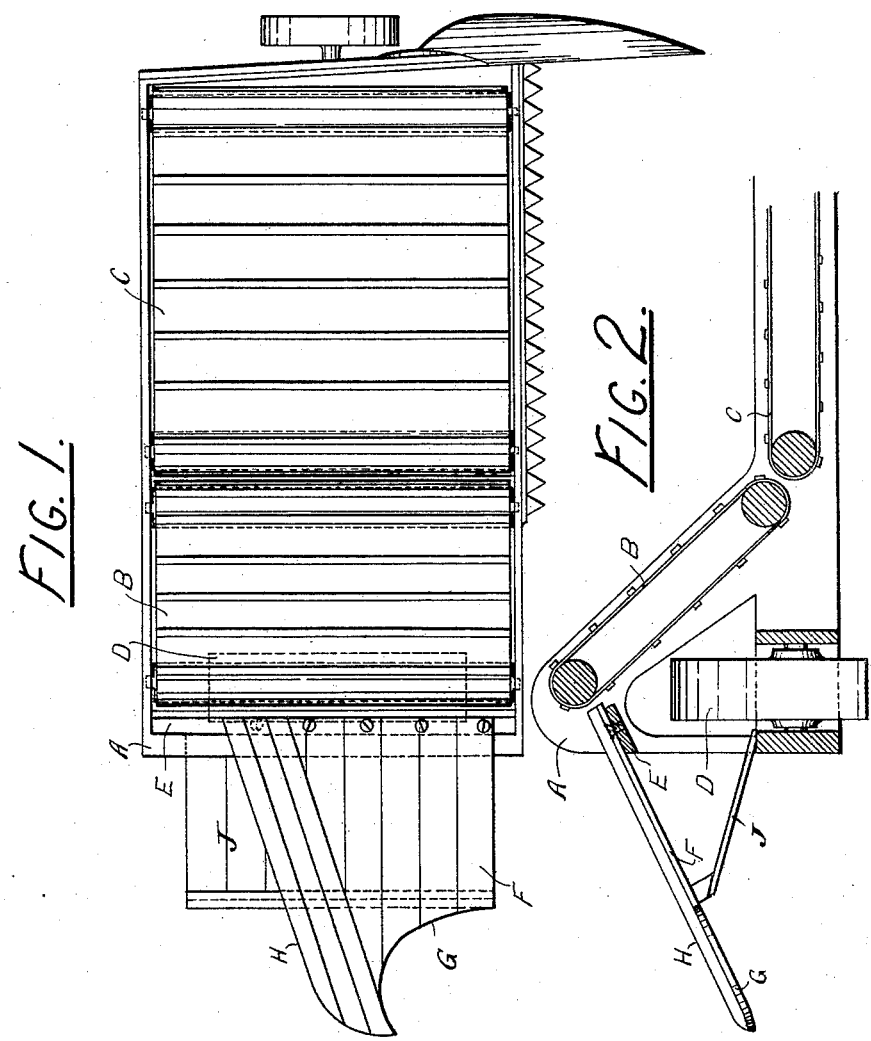

UNITED STATES PATENT OFFICE.

DANIEL B. SCHAEFFER, OF FLEETWOOD, PENNSYLVANIA.

SWATHING ATTACHMENT FOR HARVESTERS.

SPECIFICATION forming part of Letters Patent No. 418,141, dated December 24, 1889.

Application filed September 21, 1889. Serial No. 324,670. (No model.)

*To all whom it may concern:*

Be it known that I, DANIEL B. SCHAEFFER, a citizen of the United States, residing at Fleetwood, in the county of Berks and State of Pennsylvania, have invented certain new and useful Improvements in Swathing Attachments for Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide an improved attachment for harvesters adapted to be attached thereto in place of the usual binding attachments and to deposit the crop upon the ground instead of at once binding it into sheaves. Heretofore devices for this purpose have been applied to harvesting-machines, a spiral delivery-chute having been arranged to deliver the grain upon the ground in the same manner as when cut by hand with a cradle. In my invention this spiral form of delivery-chute is dispensed with and the grain is deposited in a continuous swath, with the stalks lying at right angles to the path of the machine and the heads outward, by means of a very simple inclined platform, the rear portion of which is extended farther from the side of the machine than the forward portion, thus permitting the forward ends or butts of the grain to fall to the ground, while the heads are still held by the extended rear portion of the platform, the cut-away forward corner being so shaped as to cause the heads of the grain to be swung outward by the forward motion of the machine, while the butts rest upon the ground until the stalks fall clear of the extended platform and lie at right angles to the path of the machine.

Figure 1 is a partial plan view of a harvester, showing my improved swathing device attached thereto. Fig. 2 is a sectional elevation of the same.

A is the frame, B the elevator-apron, C the conveying-apron, and D the main wheel, of any ordinary farm-harvester.

E is the usual frame-piece below the top elevator-rollers, to which the binder attachment is ordinarily secured, but which serves in the construction presented as a means of securing the platform F, the peculiar construction and arrangement of which effect the desired object already referred to. This platform is preferably made of wood, and when attached to the machine projects from the stubble side at an incline, which causes the grain dropped upon it from the elevator-aprons to readily slide toward the outer and lower end of the platform. The forward corner at the lower end of the platform, however, is cut away, as at G, forming a curved recess extending toward the rear, which latter portion of the platform, however, is thus extended farther from the machine and nearer to the ground than is the forward portion. As the grain slides down the incline and the butts get to the recess G, being no longer supported, they overbalance the heads, which still rest upon the extended rear portion of the platform and drop toward the ground, thus raising the grain toward a vertical position with the heads up, from which position, however, it is quickly thrown over by the continued advance of the machine, which causes the edge of the suitably-shaped recess G to push it outward until it drops under the extended portion of the platform and lies at right angles to the path of the machine.

The rear edge H of the platform may be placed at an oblique incline to the flat portion thereof, as shown, thus causing the heads of the grain to be somewhat raised as it slides down the machine; but this is in no way essential to the operation of the device, the principle of my invention consisting in extending the rear portion of the inclined platform beyond the front portion, whereby the grain is made to assume an approximately vertical position, and is then thrown over at right angles by the continued movement of the machine. The inclined surface of the platform is flat, no curves being required, and it is of exceedingly simple and economical construction, yet accomplishes the work in a most satisfactory manner. The supplemental platform J beneath it serves as a brace to the main inclined platform, and may also be used as a receptacle for tools which it is desirable to carry with the machine.

What I claim is—

In a harvesting-machine, the combination, with mechanism for elevating the grain over the main drive-wheel, of an inclined platform arranged to receive the grain and having its lower forward corner cut away, as at G, whereby the butts of the grain are allowed to fall to the ground first and the stalks are swung outward and deposited at right angles to the line of swath, substantially as set forth.

In testimony whereof I affix my signature in presence of two witnesses.

DANIEL B. SCHAEFFER.

Witnesses:
   MOSES KUTZ,
   E. M. RAPP.